United States Patent
Willars et al.

(10) Patent No.: US 12,081,609 B2
(45) Date of Patent: Sep. 3, 2024

(54) METHOD AND APPARATUS FOR TRANSMITTING REAL-TIME MEDIA STREAM

(71) Applicant: Telefonaktiebolaget LM Ericsson (publ), Stockholm (SE)

(72) Inventors: Per Willars, Vaxholm (SE); Per-Erik Brodin, Scotts Valley, CA (US)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 17/774,840

(22) PCT Filed: Nov. 2, 2020

(86) PCT No.: PCT/EP2020/080703
§ 371 (c)(1),
(2) Date: May 5, 2022

(87) PCT Pub. No.: WO2021/089487
PCT Pub. Date: May 14, 2021

(65) Prior Publication Data
US 2022/0394076 A1     Dec. 8, 2022

Related U.S. Application Data
(60) Provisional application No. 62/933,260, filed on Nov. 8, 2019.

(51) Int. Cl.
*H04L 65/75*     (2022.01)
*H04L 47/38*     (2022.01)
(Continued)

(52) U.S. Cl.
CPC .............. *H04L 65/75* (2022.05); *H04L 47/38* (2013.01); *H04L 65/80* (2013.01); *H04W 28/06* (2013.01)

(58) Field of Classification Search
CPC ......... H04L 65/75; H04L 65/80; H04L 47/38; H04W 28/06
See application file for complete search history.

(56) References Cited

U.S. PATENT DOCUMENTS

| | | | |
|---|---|---|---|
| 6,618,591 B1 * | 9/2003 | Kalliokulju | H04W 28/22 455/452.2 |
| 7,587,217 B1 * | 9/2009 | Laakso | H04W 52/225 370/318 |

(Continued)

FOREIGN PATENT DOCUMENTS

| | | |
|---|---|---|
| CN | 1728677 A | 2/2006 |
| CN | 107710812 A | 2/2018 |

(Continued)

OTHER PUBLICATIONS

PCT International Search Report, mailed Dec. 11, 2020, in connection with International Application No. PCT/EP2020/080703, all pages.

(Continued)

*Primary Examiner* — Jonathan A Bui
(74) *Attorney, Agent, or Firm* — Leffler Intellectual Property Law, PLLC

(57) ABSTRACT

A method and apparatus for transmitting a real-time media stream in a communications network. The method comprises separating an essential part of the media stream from a non-essential part of the media stream in said real-time media stream and transmitting the essential part of the media stream on a first bearer and the non-essential part of the media stream on a second bearer. Priority of the first bearer is higher than priority of the second bearer. The method also comprises performing adaptation of the essential part of the media stream in response to a change of traffic conditions on the second bearer.

20 Claims, 8 Drawing Sheets

(51) Int. Cl.
*H04L 65/80* (2022.01)
*H04W 28/06* (2009.01)

(56) References Cited

U.S. PATENT DOCUMENTS

| | | | | |
|---|---|---|---|---|
| 2011/0222406 | A1* | 9/2011 | Persson | H04W 72/52 |
| | | | | 370/236 |
| 2012/0099416 | A1* | 4/2012 | Bekiares | H04N 21/631 |
| | | | | 370/216 |
| 2012/0100879 | A1* | 4/2012 | Tine | H04L 47/724 |
| | | | | 455/512 |
| 2012/0250762 | A1 | 10/2012 | Kaye et al. | |
| 2013/0042278 | A1* | 2/2013 | Won | H04N 21/816 |
| | | | | 725/62 |
| 2013/0282917 | A1* | 10/2013 | Reznik | H04N 21/234327 |
| | | | | 709/231 |
| 2021/0377787 | A1* | 12/2021 | Zhuo | H04W 28/0278 |

FOREIGN PATENT DOCUMENTS

| | | | | |
|---|---|---|---|---|
| EP | 3531417 | A1 | 8/2019 | |
| GB | 2386284 | A * | 9/2003 | H04W 28/10 |

OTHER PUBLICATIONS

PCT Written Opinion, mailed Dec. 11, 2020, in connection with International Application No. PCT/EP2020/080703, all pages.
Chinese Office Action and Search Report issued Nov. 1, 2023 in connection with Chinese Application No. 22080093686.7, 13 pages.

* cited by examiner

METHOD AND APPARATUS FOR TRANSMITTING REAL-TIME MEDIA STREAM

TECHNICAL FIELD

The present invention relates to transmitting a media stream in a communications network, in general, and in particular to adaptation of transmission of a real-time media stream in a communications network.

BACKGROUND

In a radio network, the data packets to be transmitted to and from devices are stored in queues. There is one queue for each data radio bearer. Each device may have one or more data radio bearers. The scheduler is a function in the radio network that assigns radio resources to the different radio bearers, i.e. it decides what data packets are to be transmitted across the radio interface. There are different scheduler algorithms and policies that can be configured to control how the radio resources are prioritized between data bearers in case of congestion (i.e., in case there are not enough radio resources to transmit all data packets that are queued). A typical policy to arbitrate between devices with different radio quality is to use "proportional fair scheduling", meaning that users in worse conditions get assigned more radio resources while still getting lower bit rates than users in good conditions.

The Quality of Service (QoS) framework provides other policies to allow the scheduler to prioritize resources to certain subscribers or for certain service types. In the latter case, the data radio bearer is associated with a specific value of the QCI parameter, and the scheduler applies a priority policy for that QCI value. These policies include relative priority scheduling with a configured factor, which determines basically how much more resources should be applied to the prioritized bearer, all other factors being equal. There are also absolute priority policies (always send all data on these bearers first). Further there are max delay-based policies, which increase the priority drastically as queuing delay approaches a configured upper limit; and minimum bit rate policies, that increase the priority drastically (or elevates to absolute priority) if the served bit rate is below a configured minimum value.

SUMMARY

According to a first aspect of the present invention there is provided a method of transmitting a real-time media stream in a communications network. The method comprises separating an essential part of the media stream from a non-essential part of the media stream in said real-time media stream. The method also comprises transmitting the essential part of the media stream on a first bearer and the non-essential part of the media stream on a second bearer, wherein priority of the first bearer is higher than priority of the second bearer. Further, the method comprises performing adaptation of the essential part of the media stream in response to a change of traffic conditions on the second bearer.

According to a second aspect of the present invention there is provided an apparatus for transmitting a real-time media stream in a communications network. The apparatus comprises a processing circuitry and a memory. The memory contains instructions executable by the processing circuitry such that the apparatus is operative to separate an essential part of the media stream from a non-essential part of the media stream in said real-time media stream. The apparatus is also operative to transmit the essential part of the media stream on a first bearer and the non-essential part of the media stream on a second bearer, wherein priority of the first bearer is higher than priority of the second bearer. Further, the apparatus is operative to perform adaptation of the essential part of the media stream in response to a change of traffic conditions on the second bearer.

According to a third aspect of the present invention there is provided a communications network comprising an apparatus as the one defined above.

Further features of the present invention are as claimed in the dependent claims. The present invention provides the benefit of enabling AR/VR (sometimes referred to as "XR") streaming and cloud gaming applications (low latency applications) to adapt to network conditions, while maintaining low latency and thus a reliable user experience. Further advantages of more specific embodiments are described together with description of these embodiments.

BRIEF DESCRIPTION OF THE DRAWINGS

The present invention will be understood and appreciated more fully from the following detailed description taken in conjunction with the drawings in which.

DETAILED DESCRIPTION

Figure 1:
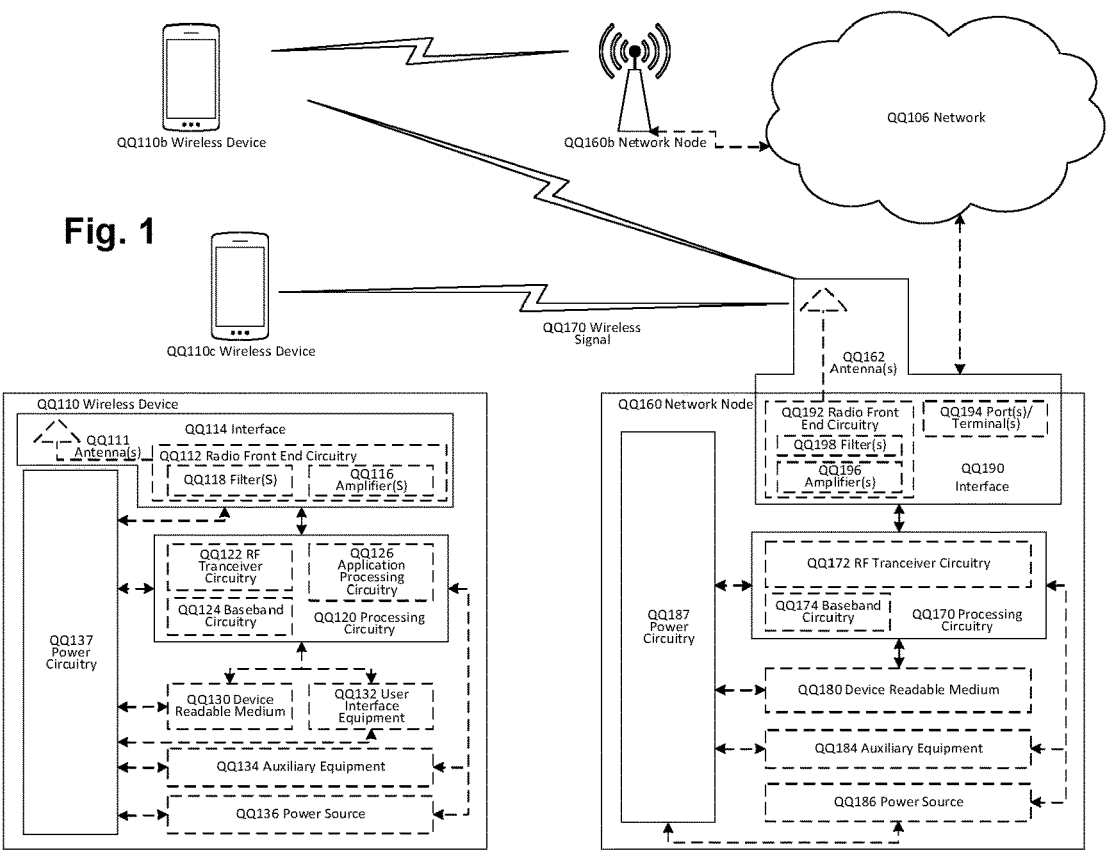
FIG. 1, FIG. 4 and FIG. 5 are diagrams illustrating a wireless network in which embodiments of the present invention may be implemented.

In the following description, for purposes of explanation and not limitation, specific details are set forth such as particular architectures, interfaces, techniques, etc. in order to provide a thorough understanding of the solution. However, it will be apparent to those skilled in the art that the solution may be practiced in other embodiments that depart from these specific details. In other instances, detailed descriptions of well-known devices, circuits, and methods are omitted so as not to obscure the description of the solution with unnecessary details.

Reference throughout the specification to "one embodiment" or "an embodiment" means that a particular feature, structure, or characteristic described in connection with an embodiment is included in at least one embodiment of the present solution. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Without the use of Quality of Service policies, the data throughput on a data radio bearer generally decreases with the load in the system and decreases with a worse radio link quality. When the load increases, e.g. other users start data sessions in the same cell, the resources in the cell must be shared with this other traffic. Hence the maximum throughput available to the current data radio bearer is reduced. And when the radio link quality decreases, represented by a lower Signal-to-Noise-and-Interference-Ratio (SINR), e.g. when the device moves to a location further from the cell tower, then the system must use more resources per transferred data bit, meaning a lower max throughput.

A new class of applications with rendering (or parts of rendering) in the "cloud", will require low latency and moderate to high data rates communication. Similar to MPEG-DASH and other traditional content streaming, solutions are expected where endpoints adapt the data rate to the available throughput in the network. MPEG-DASH and similar technologies for adaptive bitrate "live" streaming are considerably easier to adapt since one can build up a buffer of several seconds and monitor the buffer level and adapt the bitrate so that over time it will not be less than the playout rate. But for these real-time applications, it is essential to avoid buffering (thus latency) build up, so the challenge is to detect the need to adapt early enough, so that adaptation can happen before any impact on the end user experience. State of the art methods for congestion control of real-time multimedia are using sender based self-clocking, using feedback packets with acknowledgments from the receiver to monitor the round-trip delay and reduce the sending bitrate in response to any increase in that delay. However, there is a big risk that increased load (e.g. other user starting to watch heavy video clips), or decreased radio quality (e.g. stepping indoors), will mean that a burst of packets will arrive too late until the application has adapted with a lower media rate, and buffers have been drained (i.e. the application has caught up with previously added latency).

A main challenge for the new low-latency applications is how to adapt to the varying conditions in a mobile network. Like MPEG-DASH and other traditional content streaming, endpoints will try to adapt the data rate to the available throughput in the network. It is much more challenging for real-time applications, and it is essential to avoid buffering build up (thus latency), so the challenge is to detect the need to adapt early enough, so that adaptation can happen before any impact on the end user experience. State of the art methods for congestion control of real-time multimedia are using sender based self-clocking, using feedback packets with acknowledgments from the receiver to monitor the round-trip delay and reduce the sending bitrate in response to any increase in that delay. However, as explained earlier, there is a big risk that increased load, or decreased radio quality, will mean that a burst of packets will arrive too late for the application to adapt with a lower media rate, and buffers have been drained. Even when the throughput could be sustained during higher network loads, there could still be latency build-up due to queuing in the network which would have to be mitigated by lowering the sending bitrate.

Conversely, it is difficult for the application to know when it is safe to increase the media rate to a higher quality. The application may try to "probe" for a higher rate by temporarily increasing the media rate, or preferably by adding redundant packets using Forward Error Correction (FEC). However, if the higher media rate cannot be sustained, this would cause a buildup of buffer in the networks, which will impact the end-user experience (by a burst of late arriving packets) until the data rate is decreased to the original level.

Solutions known as ECN (Explicit Congestion Notification) and L4S (Low latency low loss Scalable throughput) are standardized in order to enable the network to notify the endpoints and applications of the need to reduce the data rate due to congestion. These are, however, not supported in mobile networks to signal radio resource congestion.

In this disclosure the terms bandwidth and throughput are used. Throughput refers to the amount of data actually transmitted through the network, whereas bandwidth is the maximum throughput that could be supported. Because the solution disclosed in this document deals with a problem of the network not being capable of delivering all the data due to traffic congestion, these two terms when not indicated otherwise refer to the congestion conditions and then throughput at congestion is the bandwidth.

The present solution is based on serving non-essential parts of the communication between the application endpoints on a bearer with a lower priority, while serving essential parts of the communication on a bearer with a higher priority. Since the lower priority bearer will suffer from latency impact at an earlier stage (during increased system load or during radio link deterioration) than the higher priority bearer, the applications can detect the need to rate adapt early by monitoring the traffic on the bearer with the lower priority. The bitrate adaptation of the essential parts of the communication, including switching to a lower quality media rate, will have time to execute before any impact on the essential parts of the communication between the application endpoints. In this way the impact on the end-user experience is minimized. The solution enables control of the bitrate of the high priority bearer based on observations of the lower priority bearer.

Conversely, for increasing the bitrate (and in consequence improving quality of the streamed media) when the conditions improve (lower system load or better radio link quality), the applications can first increase the bitrate on the lower priority bearer to learn whether the system can handle the increased data rates. If not possible, only the non-essential packets are delayed, thus impact on QoE is minimal. If the increased data rate on the lower-priority bearer can be served, then the application can infer that the network will be likely able to handle an increase also on the higher-priority bearer. The probing is preferably done using redundant Forward Error Correction (FEC) packets so that any dropped packets due to the higher sending rate can be recovered.

The distinction between essential data and non-essential data (essential part of the media stream from a non-essential part of the media stream) is based on the effect the data (part of the media stream) has on quality of experience (QoE) of the user receiving the streamed content. If the data has no impact on the QoE or very low impact then it is classified as non-essential. The threshold of what is classified as having low impact may depend on the current traffic conditions and may include more data as the traffic conditions deteriorate. In some embodiments data may be classified as non-essential if removing the data from the media stream (with the possibility of having it dropped) has lesser impact on the QoE than keeping said data in said media stream (and experiencing frame skips and freezes).

The solution will enable AR/VR (sometimes referred to as "XR") streaming and cloud gaming applications (low latency applications) to adapt to network conditions, while maintaining low latency and thus a reliable user experience.

The description of the solutions disclosed in this document is applicable to wireless and wireline-based networks. When applied to wireless networks it is applicable to 3GPP networks, in particular 3G, 4G and 5G networks. When the document is read in the context of 5G network the term "bearer" refers to "QoS flow" as well as to "data radio bearer" conventionally used in 5G documentation.

Figure 9:
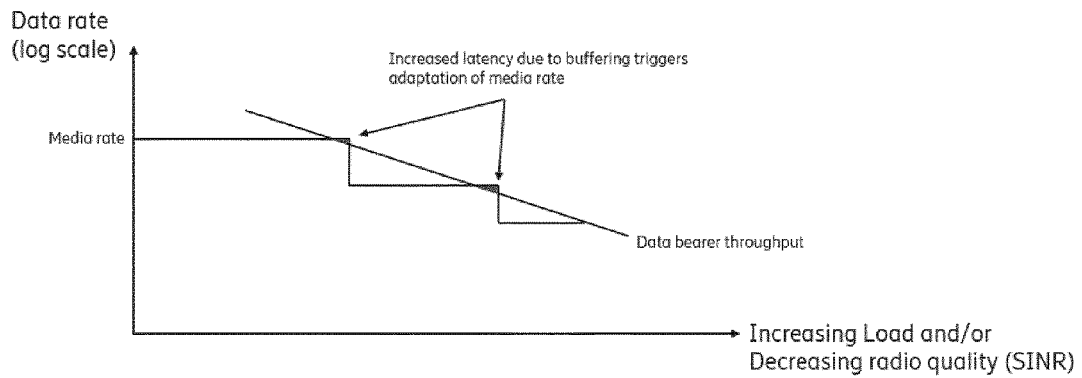
FIG. 9 illustrates the problem of detecting that bitrate adaptation is needed.

FIG. 9 illustrates the problem of detecting that bitrate adaptation is needed after there has already been an impact on the streaming service. We consider a user moving in the direction of worse radio link quality and/or the system load increasing. The throughput available to the users streaming service will then gradually decrease. When it decreases below the current media rate, the network will start buffering packets. The receiving endpoint will notice this as an increase in latency, i.e. the data in the receiving buffer will be drained. The endpoint or application will then trigger a signal to reduce the media rate, but there is a high risk that this would take effect only after a buffer underrun at the receiver buffer, i.e. a burst of packets arrives too late, missing the deadline for displaying to the user. This causes a bad quality of experience. For real-time applications with lots of interactivity like games these "glitches" can adversely affect the user-experience in a way that can mean the difference between winning and losing a game.

Figure 10:
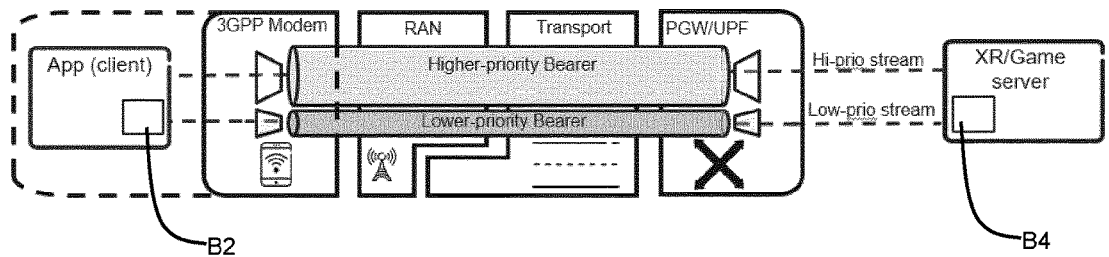
FIG. 10 illustrates the present invention in a system diagram.

FIG. 10 illustrates the present solution with a system diagram. The mobile network (RAN) provides two data radio bearers with different priority levels and these two bearers are extended through the transport network towards the core network (PGW/UPF). It is important to note that although the explanation above and further down in this document refers to deterioration of traffic conditions in the mobile network (RAN) the deterioration may also happen in the transport network and the present solution also works when the deterioration (and improvement) of traffic conditions occurs in the transport network. The application endpoints (client and server) use these bearers for two different data streams. The need to rate adapt is detected on disturbances on the lower priority bearer and data stream.

Figure 11:
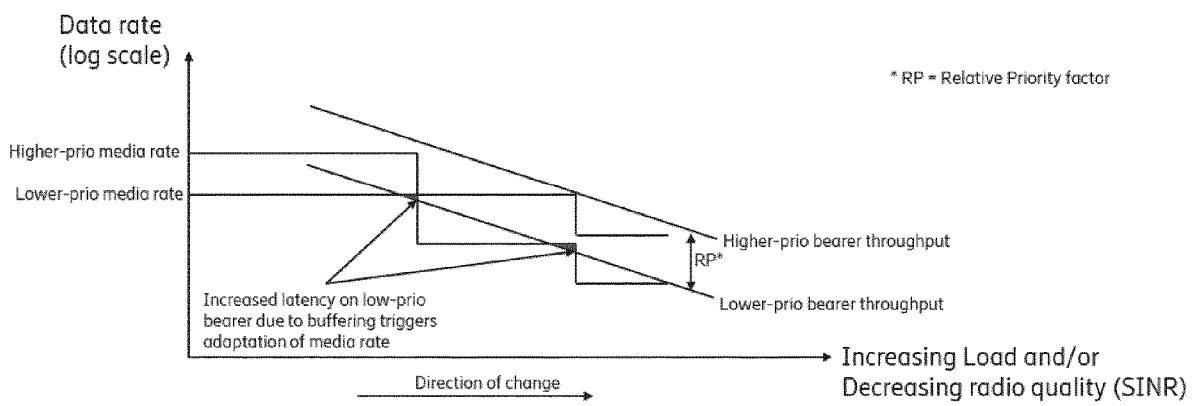
FIG. 11 to FIG. 14 are diagrams illustrating rate adaptation in embodiments of the present invention.

FIG. 11 illustrates one embodiment of the solution. The service is using two bearers, one with a higher priority and one with a lower priority. The high priority bearer is preferably configured with scheduler priority policy to ensure that, at a congestion event (load-based on radio quality based), the scheduler will prioritize to transmit data packets on the higher priority bearer (no queueing), while allowing build-up of a queue delay for the data on the lower priority bearer.

The available throughput will decrease on both bearers, as the user is subject to worse radio link quality and/or increased cell load (deteriorated traffic conditions). But the relative priority setting will ensure that the high priority bearer receives a factor RP higher throughput than the lower priority bearer. The sending side (e.g. XR/game server in FIG. 10) serves two data streams, where the essential data to keep a continuous service is transported on the higher priority bearer, while non-essential data (e.g. added redundancy or additional data that may improve quality if present) is transported on the lower priority bearer. The media bitrate on the higher priority data stream is preferably less than a factor RP higher than the media bitrate on the lower priority data stream. The factor RP is calculated as a ratio of a value indicative of priority of the high priority bearer, $RP_H$, to a value indicative of priority of the low priority bearer, $$RP_L \left( RP = \frac{RP_H}{RP_L} \right).$$

It is recommended to have a margin on top of this. This ensures that, whenever there is congestion, i.e. the media bitrates of the data streams cannot be supported, it is always the lower priority data stream that suffers first. When this happens, the receiving application or endpoint (App (client) in FIG. 10):

maintains a decent quality of experience using only the high priority (essential) data stream;

detects the increasing latency on the lower priority data stream;

informs the sending endpoint via a transport protocol or application-specific message.

The sending endpoint then reduces the media rate for both data streams in order to cope with the reduced network capabilities.

Figure 12:
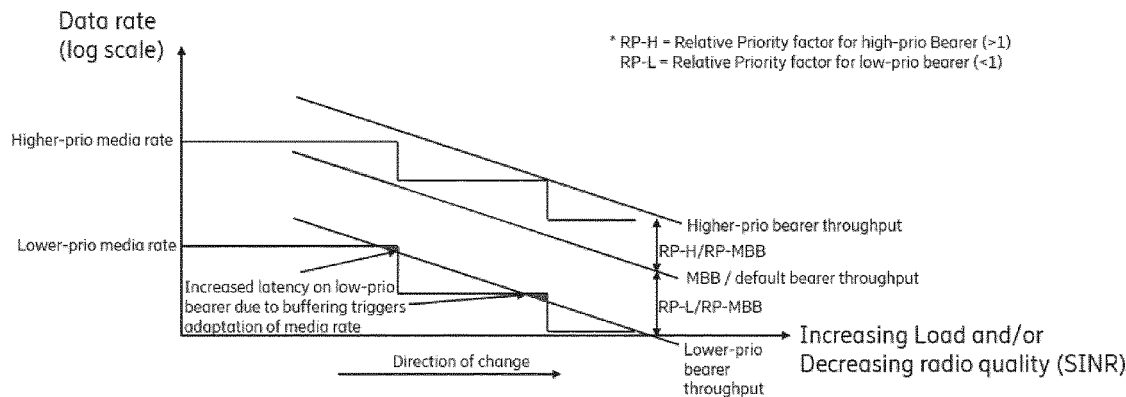

FIG. 12 illustrates that both bearers are dedicated bearers, and how their priorities relate to the priority for general MBB bearer (typically the default bearer). In this embodiment, the factor RP above is the combination of an increased priority $RP_H$ for the high priority bearer ($RP_H>1$ relative to the default MBB bearer), and the decreased priority $RP_L$ for the low priority bearer ($RP_L<1$ relative to the default MBB bearer). Thus, as explained earlier $$RP = \frac{RP_H}{RP_L}.$$

One advantage of this arrangement is that a larger difference in priority RP, and thus larger difference in media rate between the two media streams, can be supported. Thus, the low priority (non-essential) data stream can detect congestion even with a lower data rate.

In one embodiment a default priority is that of the mobile broadband (MBB) bearer, which is used for normal Internet/MBB traffic. In an embodiment, the priority of the high priority bearer, $RP_H$ can be higher than the priority of the MBB bearer, $RP_{MBB}$, meaning that at congestion, the high priority bearer would get a higher throughput than the default bearer carrying MBB traffic. Hence the priority of the MBB bearer, $RP_{MBB}$, could either be the same as $RP_L$, or the same as $RP_H$, or anything else (e.g. between $RP_L$ and $RP_H$ as in FIG. 12).

Figure 13:
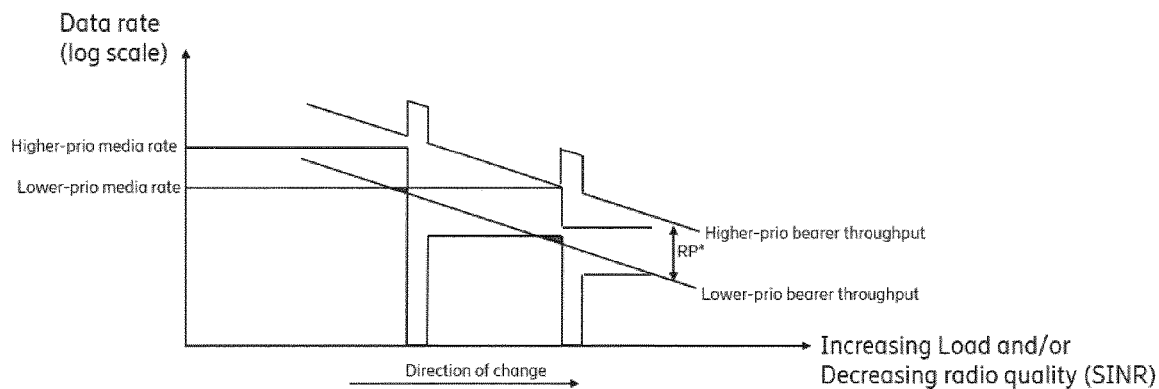

FIG. 13 illustrates a variation where the sending side of the application (e.g. XR/game server in FIG. 10) reduces the media rate of the low priority data stream to zero during a short period when triggering rate adaptation. This will help the network to drain buffers to allow the low-priority data stream to catch up and start again from a low-latency state.

Figure 14:
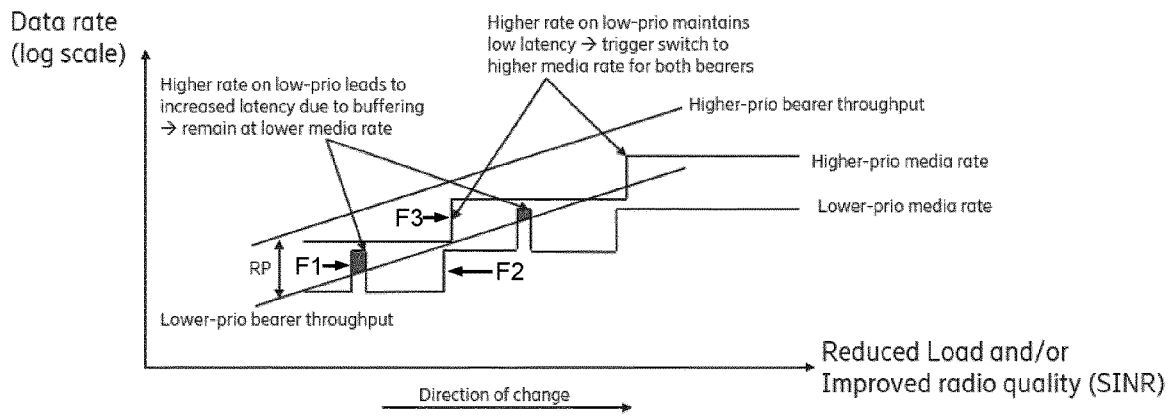

FIG. 14 illustrates rate adaptation upwards at improving conditions. Probing for a higher media rate is done on the lower priority bearer. When probing for a higher rate on the lower priority bearer leads to an increased delay on this data stream (as measured by the receiving end of the application), it is not safe to increase media rate overall for the application, and the media rate stays at the current rate. The first increase of bitrate (media quality) on the low priority bearer resulted in buffer underrun and had to be reversed (F1). On the other hand, when the low delay is sustained on the lower priority bearer while probing (using a higher data rate), this means that it is safe to increase media rate on both data streams. This is shown as the next attempt in FIG. 14: the low priority bearer was able to support this increased bitrate (F2) and the corresponding increase could be applied in the high priority bearer as well (F3).

Figure 6:
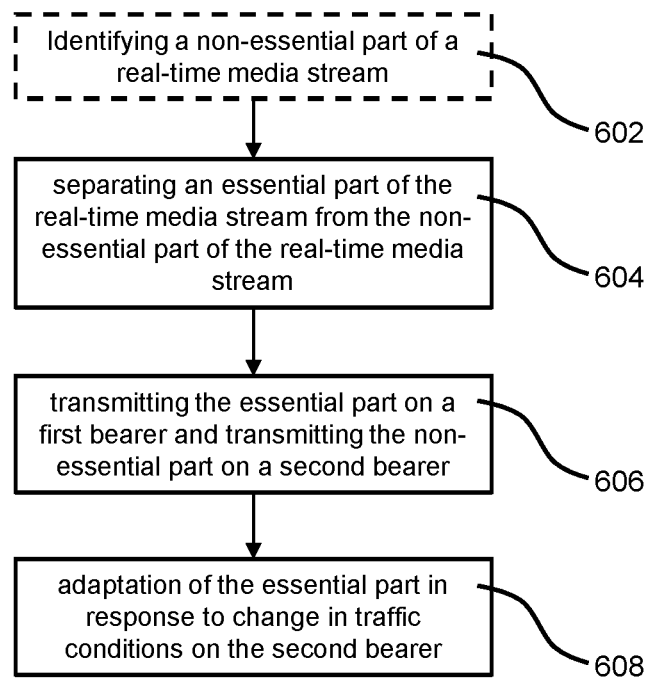
FIG. 6 is a flow chart illustrating one embodiment of a method of transmitting a real-time media stream in a communications network.

FIG. 6 illustrates one embodiment of the method of transmitting a real-time media stream in a communications network. The method may equally be applied in both upstream and downstream directions, for example if used in a gaming application between two players there are two real-time media streams, one from player A to player B and one going in the opposite direction. The method may be applied in both directions.

Figure 7:
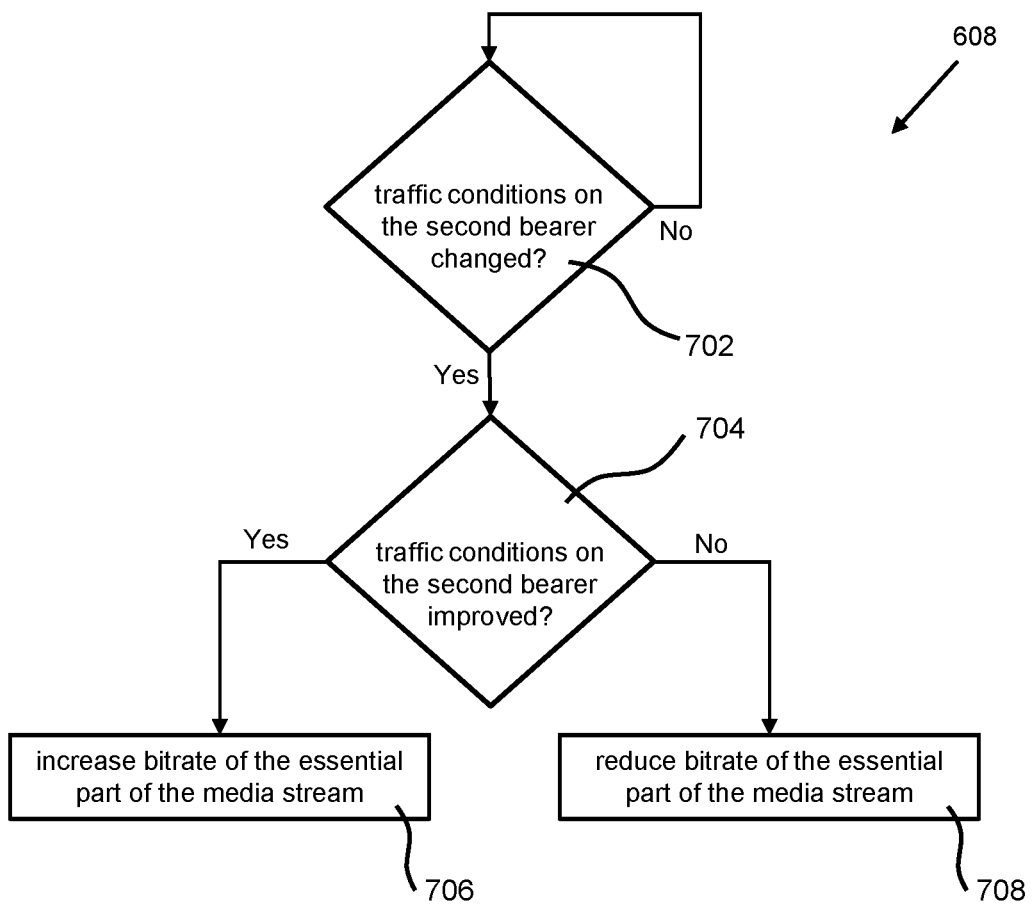
FIG. 7 is a flow chart illustrating details of the embodiment of the method shown in FIG. 6.

Preferably the method comprises separating, 604, an essential part of the media stream from a non-essential part of the media stream in said real-time media stream. The essential part of the media stream is transmitted on a first bearer and the non-essential part of the media stream is transmitted on a second bearer, 606, wherein priority of the first bearer is higher than priority of the second bearer. In response to a change of traffic conditions (FIG. 7, 702—yes) on the second bearer the method comprises performing adaptation of the essential part of the media stream, 608.

Preferably, the changed traffic conditions comprise change in traffic load in the system or change in radio link quality or a combination of these two.

The solution is applicable to situations when the essential and non-essential parts of the real-time media stream are well defined, for example by their point of origin. For example, a video stream from a side or back camera providing 360-degree video feed from a player's head-mounted cameras may be classified as non-essential, so it will be separated from the remaining essential data (e.g. video stream from a front camera) already at the point of creation.

Other examples of well defined non-essential data include surround encoding of the sound (mono sound would be essential) and HDR encoding of video (video with regular dynamic range would be essential).

In one embodiment the method comprises identifying, 602, the non-essential part of the media stream in said real-time media stream. This may be applicable, for example to a 360-degree video stream to a VR/AR headset from a server where everything in the 360-degree feed may potentially be in front of the receiving user (when the user turns his/her head). At any point in time certain parts of the 360-degree video stream will be in front of the receiving user (and these are essential) and certain parts of the feed will be sides and back. These side and back views may be classified as non-essential data, but this may dynamically change as the user turns his/her head. Hence separating essential and non-essential data may be preceded by a real-time identification of non-essential/essential data.

Referring again to FIG. 7, which illustrates aspects of some embodiments of step 608 in greater detail, preferably, the adaptation of the essential part of the media stream on the first bearer comprises reducing bitrate, 708, of the essential part of the media stream in response to deterioration of the traffic conditions on the second bearer, 702—yes, 704—no. To reduce the bitrate, one or more parameter of the media stream may be changed. Preferably, the reducing of the bitrate of the essential part of the media stream comprises at least one of: increasing compression, reducing frame rate, reducing resolution and reducing colour depth of the essential part of the media stream transmitted on the first bearer. There may be more parameters that could be changed, separately or in combination, that would affect the quality of the media stream and in consequence the bitrate.

In one embodiment the deterioration of the traffic conditions on the second bearer is detected by detecting that a receiving buffer (B2 in FIG. 10) level drops to a first threshold value, wherein the receiving buffer, B2, operates at a receiving end on the second bearer. The first threshold value may be implementation specific and configured at a level that balances the risk of buffer underrun when set too low (and the presence of frame skipping or freezing) with too early triggering bitrate adaptation when set too high.

Alternatively, the deterioration of the traffic conditions on the second bearer may be detected by measuring a rate at which buffer fill level at the receiving buffer, B2, drops. Again, this may be implementation specific. If a buffer-fill level starts dropping rapidly it is a good indication that the supply of the buffer is slower than consumption of the buffer content and this may eventually lead to buffer underrun.

In yet another embodiment, if the communications network supports packet marking, the deterioration of the traffic conditions on the second bearer may be detected by detecting the presence of the packet marking.

In yet another embodiment the deterioration of the traffic conditions on the second bearer may be detected by detecting a level of the transmitting buffer (B4 in FIG. 10) rising to a second threshold value, wherein the transmitting buffer, B4, operates at a transmitting end on the second bearer. Similar to previously described embodiments, the second threshold value may be implementation specific and configured at a level that balances the risk of buffer overflow when set too high (when the transmitting end attempts to transmit more data than the network can handle packets will be lost at buffer overflow) with the risk of triggering bitrate adaptation too early when the second threshold is set too low.

In this embodiment it is proposed to use an end-to-end transport protocol (such as TCP or RTCP for RTP/UDP) which provides feedback from the transport protocol receiving endpoint to the transport protocol sending endpoint. This allows for using a network congestion control algorithm at the sender side to only send as much data as can be transferred without buffering in the network. In this implementation there may be a buffer at the transmitting side, buffer B4, and detecting the need to adapt is done based on when this buffer starts to increase. One such congestion control mechanism is called SCReAM.

When the traffic conditions improve, 704—yes, the method in an embodiment disclosed here adapts the essential part of the media stream on the first bearer by increasing bitrate, 706, of the essential part of the media stream. In consequence the quality of the media stream consumed by the end user improves. In embodiments, increasing the bitrate of the essential part of the media stream may be achieved by applying at least one of reducing compression, increasing frame rate, increasing colour depth and increasing resolution of the essential part of the media stream transmitted on the first bearer.

Preferably, the improvement of traffic conditions on the second bearer may be detected by detecting that the second bearer can sustain an increased bitrate of the non-essential part of the media stream. This is illustrated in FIG. 14. The first increase of the bitrate on the low priority bearer resulted in buffer underrun (F1) and had to be reversed. At the next attempt (F2) the low priority bearer was able to support this increased bitrate and the corresponding increase could be applied in the high priority bearer as well (F3).

More specifically, determining that the second bearer can sustain an increased bitrate of the non-essential part of the media stream may comprise determining that after increasing the bitrate of the non-essential part of the media stream on the second bearer, the fill level of the receiving buffer, B2, operating at a receiving end on the second bearer remains above the first threshold. Remaining above the first threshold means that the application displaying the content for the end user has the content readily available and the risk of frame skipping, or freezing is minimised.

Alternatively, determining that the second bearer can sustain an increased bitrate of the non-essential part of the media stream comprises determining that after increasing the bitrate of the non-essential part of the media stream on the second bearer, the fill level of the receiving buffer, B2, operating at a receiving end on the second bearer is not decreasing.

In yet another embodiment determining that the second bearer can sustain an increased bitrate of the non-essential part of the media stream comprises determining that after increasing the bitrate of the non-essential part of the media stream on the second bearer, the fill level of the transmitting buffer, B4, operating at a transmitting end on the second bearer remains below the second threshold.

In yet another embodiment determining that the second bearer can sustain an increased bitrate of the non-essential part of the media stream comprises determining that after increasing the bitrate of the non-essential part of the media stream on the second bearer, the fill level of the transmitting buffer, B4, operating at a transmitting end on the second bearer is not increasing.

Monitoring the transmitting buffer, B4, was discussed earlier in the context of detecting deterioration of the traffic conditions on the second bearer. In this embodiment if the monitoring of the transmitting buffer shows that the buffer-fill level remains below a certain value or is not increasing means that the network is capable of transferring the quantity of data provided by the sender. This, in turn, indicates that the second bearer can sustain an increased bitrate of the non-essential part of the media stream.

In a preferred embodiment the bitrate may be increased by at least one of: added redundancy (for example by using forward error correction), insertion of dummy data, reduction of compression, increase of frame rate, increase of resolution and increase of colour depth.

Preferably, the operation of transmitting comprises scheduling transmission of data packets based on priority of the bearers by prioritising transmission of data packets on the first bearer over the data packets on the second bearer. When the network cannot deliver all the data this allows for building-up of a delay for the data packets on the second bearer. This may happen either due to high load of other traffic (congestion), or due to poor radio link quality for this device, or a combination. In a preferred embodiment the first bearer receives a factor RP higher bandwidth than the second bearer, wherein the factor RP is calculated as a ratio of a value indicative of priority of the first bearer, $RP_H$, to a value indicative of priority of the second bearer, $$RP_L \left( RP = \frac{RP_H}{RP_L} \right).$$

Figure 8:
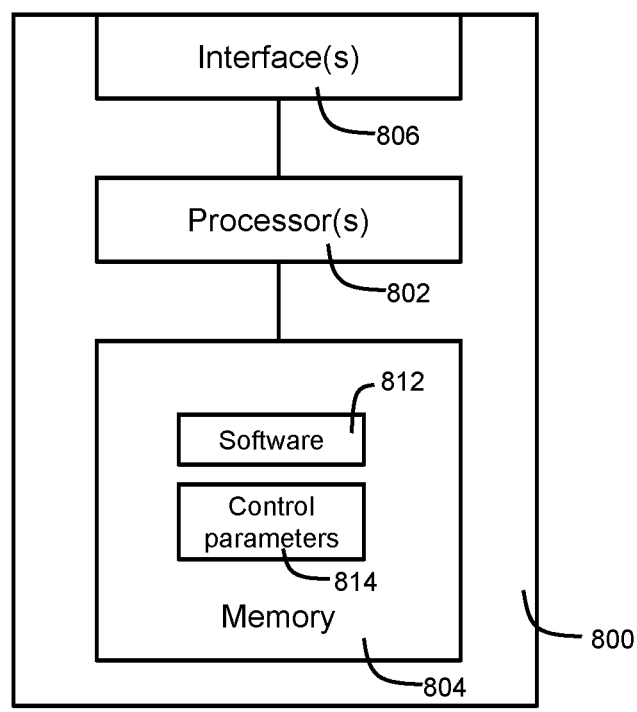
FIG. 8 is a diagram illustrating one embodiment of an apparatus implementing the method of transmitting a real-time media stream in a communications network.

FIG. 8 illustrates one embodiment of an apparatus, 800, which implements the method of transmitting a real-time media stream in a communications network described earlier. The apparatus, 800, comprises a processing circuitry, 802, and a memory, 804. The memory, 804, contains instructions executable by the processing circuitry, 802, such that the apparatus, 800, is operative to separate an essential part of the media stream from a non-essential part of the media stream in said real-time media stream and to transmit the essential part of the media stream on a first bearer and the non-essential part of the media stream on a second bearer. Priority of the first bearer is higher than priority of the second bearer. The apparatus, 800, is also operative to perform adaptation of the essential part of the media stream in response to a change of traffic conditions on the second bearer.

The apparatus, 800, may include a processing circuitry (one or more than one processor), 802, coupled to an interface, 806, and to the memory 804. The apparatus, 800, may comprise more than one interface. By way of example, the interface 806, the processor(s) 802, and the memory 804 may be connected in series as illustrated in FIG. 8. Alternatively, these components 802, 804 and 806 may be coupled to an internal bus system of the apparatus, 800. The memory 804 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 804, may include software, 808, and/or control parameters, 810. The memory, 804, may include suitably configured program code to be executed by the processor(s), 802, so as to implement the above-described method as explained in connection with FIGS. 6 and 7 as well as FIGS. 11-14.

It is to be understood that the structures as illustrated in FIG. 8 are merely schematic and that the apparatus, 800, may actually include further components which, for the sake of clarity, have not been illustrated, e.g., further interfaces or processors. Also, it is to be understood that the memory, 804, may include further program code for implementing other and/or known functionalities.

According to some embodiments, also a computer program may be provided for implementing functionalities of the apparatus, 800, e.g., in the form of a physical medium (e.g., non-transitory) storing the program code and/or other data to be stored in the memory 804, or by making the program code available for download or by streaming.

It is also to be understood that the apparatus, 800, may be provided as a virtual apparatus. In one embodiment, the apparatus, 800, may be provided in distributed resources, such as in cloud resources. When provided as virtual apparatus, it will be appreciated that the memory, 804, processing circuitry, 802, and physical interface(s), 806, may be provided as functional elements. The functional elements may be distributed in a logical network and not necessarily be directly physically connected. It is also to be understood that the apparatus, 800, may be provided as single-node devices, or as a multi-node system.

Additional Alternative Embodiments/Variations

Variations for setting the priority of the bearers:
Lower-priority: Default (MBB) bearer. Higher priority: Dedicated bearer with a Relative priority that is moderately higher.
Lower-priority: Dedicated bearer with significantly lower priority that normal MBB bearers. Higher-priority: Dedicated bearer with moderately higher priority than MBB.
This allows a larger difference in data rate (lower low-priority data rate) while still detecting congestion first on the low-priority traffic.

Lower-priority: Dedicated bearer with significantly lower priority than normal MBB bearers. Higher-priority bearer: default (MBB) bearer.
  Provides early detection, but with somewhat higher risk that sudden MBB loads could impact the essential high-priority traffic.
Consider also: reuse of Default (MBB) bearer vs Dedicated bearer with same priority as MBB.

Examples of what may be classified as non-essential part of the media stream:
  Dummy data (less preferred to use as this is a waste of bandwidth)—
  FEC, i.e. additional redundancy that can help in case there is a packet drop of essential data. FEC is also useful for probing the network when trying to increase the sending bitrate.
  For AR/VR "XR" applications with remote rendering to a head-mounted display (HMD), areas that are close to, or outside, the edges of the viewport could be sent separately as non-essential data.
  For applications with feeds from multiple cameras sending video streams from the same device, some of the video streams can be classified as essential (e.g. front camera) while others are non-essential (e.g. side and back views).

Variations for end-to-end protocols:
Application-specific feedback from receiver to sender
Reuse of different e2e transport protocols that have mechanisms to perform congestion control based on latency (SCReAM, TCP with BBR, QUIC, GCC, FRACTaL, . . . )

Variations on detecting congestion in the receiving endpoint/application:
  Detecting increased latency (reduced fill level in receiving buffer)
  Detecting loss of packet (in case the network applies a very aggressive AQM to keep latency low)

Variation including ECN/L4S marking in network:
  The solution also applies when the network supports ECN (Explicit Congestion Notification) or L4S packet marking. In operation, an ECN enabled router may add a mark in the IP header of a packet and in this way signal a forthcoming congestion. The router receiving such a marked packet responds with the same congestion indication to the sender, which then in response reduces its transmission rate. In this case, the separate non-essential part of media stream on a lower priority bearer will signal congestion on an earlier stage, which provides an additional margin for adaptation.
  Conversely, when probing for higher media rate with the lower priority bearer, the absence of ECN/L4S marking on packets indicates that it is safe to increase the media rate also on the higher priority bearer.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 2:
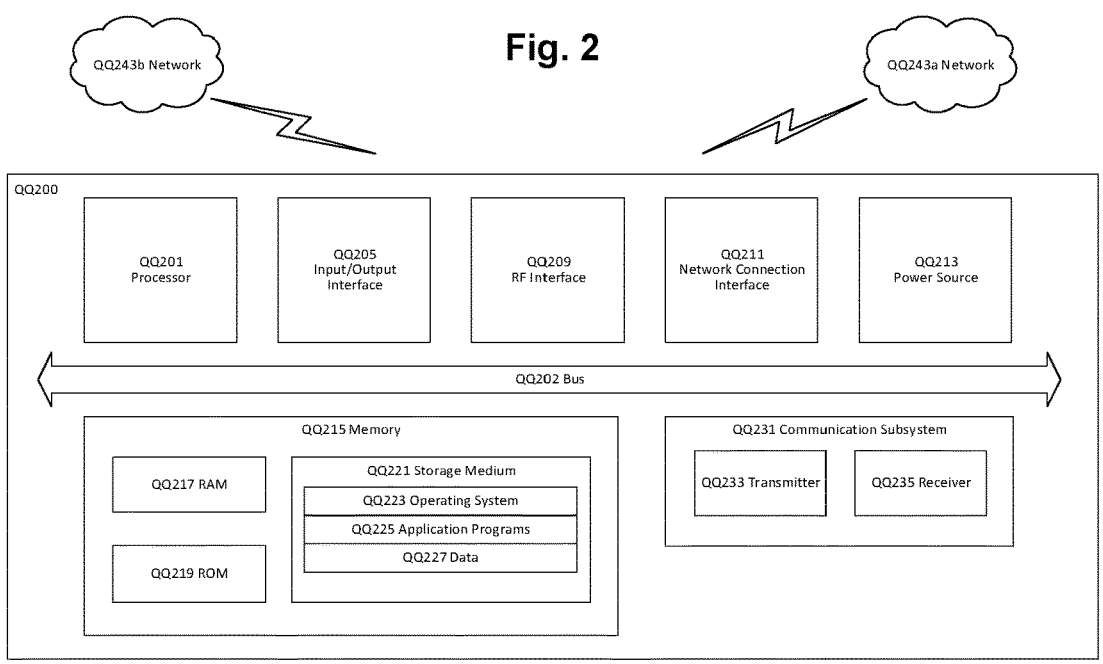
FIG. 2 is a diagram illustrating user equipment operating in a wireless network in which embodiments of the present invention may be implemented.

FIG. 2 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 2, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 3:
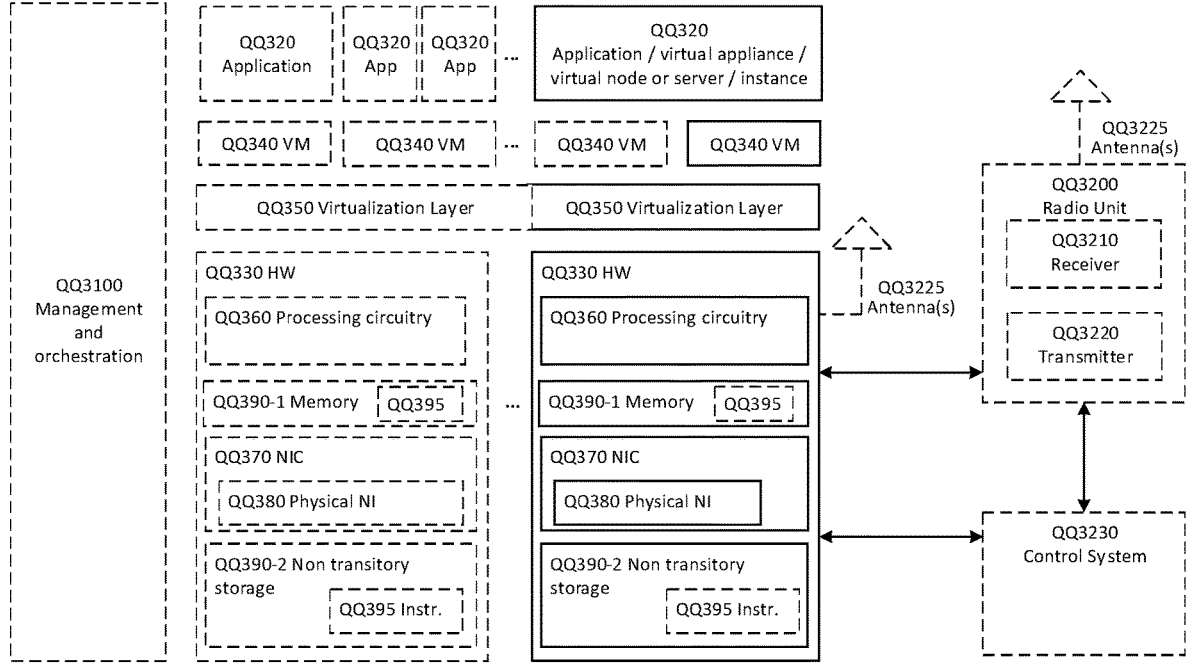
FIG. 3 is a schematic block diagram illustrating a virtualization environment in which functions implemented by some embodiments of the present invention may be virtualized.

FIG. 3 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 4:
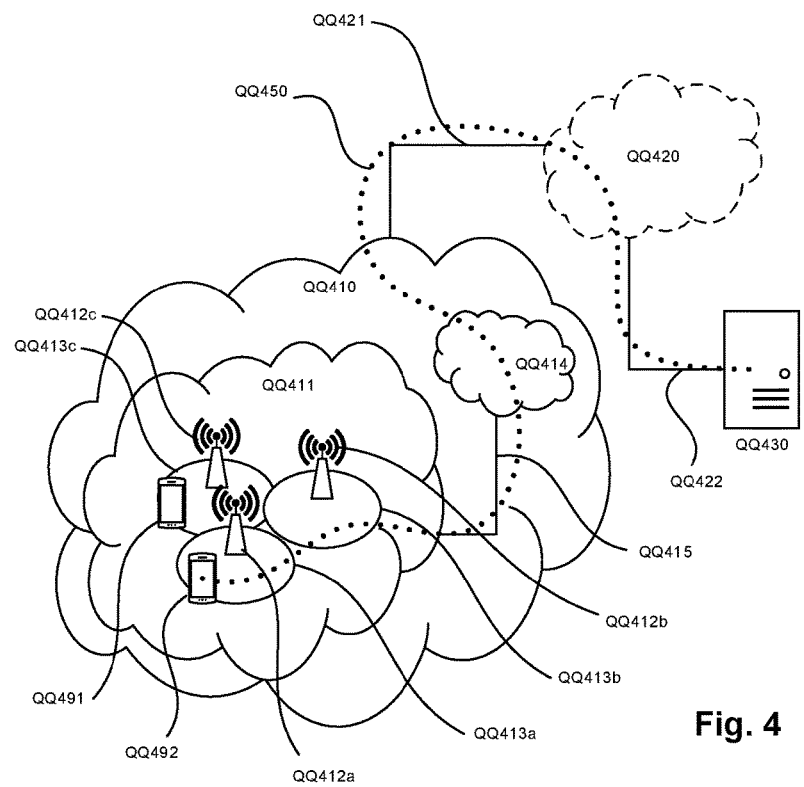

With reference to FIG. 4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 5) served by base station QQ520. Communication interface QQ526 may be configured to facilitate connection QQ560 to host computer QQ510. Connection QQ560 may be direct or it may pass through a core network (not shown in FIG. 5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 5:
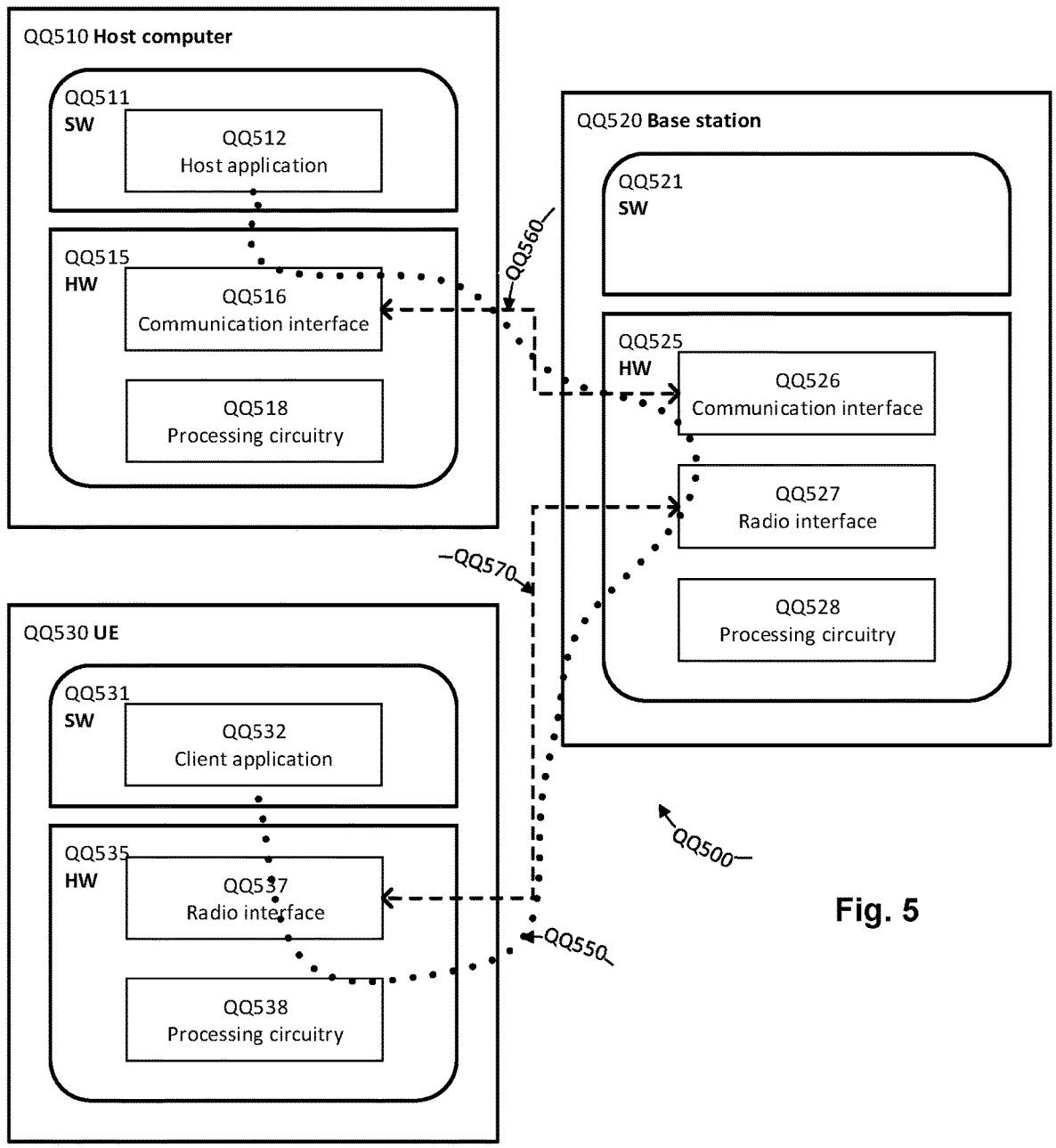

It is noted that host computer QQ510, base station QQ520 and UE QQ530 illustrated in FIG. 5 may be similar or identical to host computer QQ430, one of base stations QQ412a, QQ412b, QQ412c and one of UEs QQ491, QQ492 of FIG. 4, respectively. This is to say, the inner workings of these entities may be as shown in FIG. 5 and independently, the surrounding network topology may be that of FIG. 4.

In FIG. 5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may reduce latency of the content delivered to an end user, reduce jitter, reduce likelihood of frame freezes and frame skips and thereby provide benefits such as improved Quality of Experience of a user consuming real-time streamed media content.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

Abbreviations

Abbreviation Explanation
AR Augmented Reality
VR Virtual Reality
XR eXtended Reality or "x" (as in any) Reality
FEC Forward Error Correction
HMD Head-Mounted Display
MBB Mobile Broadband
MPEG Moving Pictures Expert Group
DASH Dynamic Adaptive Streaming over HTTP
SINR Signal-to-Interference-plus-Noise Ratio
ECN Explicit Congestion Notification
L4S Low latency low loss Scalable throughput
SCReAM Self-Clocked Rate Adaptation for Multimedia
TCP Transmission Control Protocol
BBR Bottleneck Bandwidth and RTT
RTT Round-Trip Time
QUIC Quick UDP Internet Connections
GCC Google Congestion Control
FRACTaL Flexible and Adaptive FEC for RTP Congestion Control
QoE Quality of Experience
QoS Quality of Service
QCI QoS Class Identifier
HDR High Dynamic Range
RTCP Real-time Transport Control Protocol
RTP Real-time Transport Protocol
UDP User Datagram Protocol

The invention claimed is:

1. A method of transmitting a real-time media stream in a communications network, the method comprising:
    separating a first part of the media stream from a second part of the media stream in said real-time media stream, wherein traffic in the first part of the media stream has a first classification and traffic in the second part of the media stream has a second classification;
    transmitting the first part of the media stream on a first bearer and the second part of the media stream on a second bearer, wherein priority of the first bearer is higher than priority of the second bearer;
    performing adaptation of a rate of transmission of the first part of the media stream in response to a change of traffic conditions on the second bearer,
    wherein the first part of the media stream does not use the second bearer prior to the changed condition.

2. The method according to claim 1, comprising identifying the second part of the media stream in said real-time media stream.

3. The method according to claim 1, wherein the adaptation of the first part of the media stream on the first bearer comprises reducing bitrate of the first part of the media stream in response to deterioration of the traffic conditions on the second bearer.

4. The method according to claim 3, wherein the reducing of the bitrate of the first part of the media stream comprises at least one of: increasing compression, reducing frame rate, reducing resolution and reducing colour depth of the first part of the media stream transmitted on the first bearer.

5. The method according to claim 3, wherein the deterioration of the traffic conditions on the second bearer is detected by detecting that a receiving buffer level has dropped to a first threshold value, wherein the receiving buffer operates at a receiving end on the second bearer.

6. The method according to claim 3, wherein the deterioration of the traffic conditions on the second bearer is detected by measuring a rate at which a receiving buffer level drops, wherein the receiving buffer operates at a receiving end on the second bearer.

7. The method according to claim 3, wherein if the communications network supports packet marking, the deterioration of the traffic conditions on the second bearer is detected by detecting the presence of the packet marking.

8. The method according to claim 3, wherein the deterioration of the traffic conditions on the second bearer is detected by detecting a transmitting buffer level rising to a second threshold value, wherein the transmitting buffer operates at a transmitting end on the second bearer.

9. The method according to claim 1, wherein the adaptation of the first part of the media stream on the first bearer comprises increasing bitrate of the first part of the media stream in response to improvement of the traffic conditions on the second bearer.

10. The method according to claim 9, wherein the improvement of traffic conditions on the second bearer is detected by detecting that the second bearer can sustain an increased bitrate of the second part of the media stream.

11. An apparatus for transmitting a real-time media stream in a communications network, the apparatus comprising a processing circuitry and a memory, the memory containing instructions executable by the processing circuitry such that the apparatus is operative to:
separate a first part of the media stream from a second part of the media stream in said real-time media stream;
transmit the first part of the media stream on a first bearer and the second part of the media stream on a second bearer, wherein priority of the first bearer is higher than priority of the second bearer;
perform adaptation of a rate of transmission of the first part of the media stream in response to a change of traffic conditions on the second bearer,
wherein the first part of the media stream does not use the second bearer prior to the changed condition.

12. The apparatus according to claim 11, wherein to adapt the first part of the media stream on the first bearer the apparatus is operative to reduce bitrate of the first part of the media stream in response to deterioration of the traffic conditions on the second bearer.

13. The apparatus according to claim 12, wherein to reduce the bitrate of the first part of the media stream the apparatus is operative to perform at least one of: increasing compression, reducing frame rate, reducing resolution and reducing colour depth of the first part of the media stream transmitted on the first bearer.

14. The apparatus according to claim 12, operative to detect the deterioration of the traffic conditions on the second bearer by detecting a receiving buffer level dropping to a first threshold value, wherein the receiving buffer operates at a receiving end on the second bearer.

15. The apparatus according to claim 12, operative to detect the deterioration of the traffic conditions on the second bearer by measuring the rate of a receiving buffer level dropping, wherein the receiving buffer operates at a receiving end on the second bearer.

16. The apparatus according to claim 12, wherein if the communications network supports packet marking, the apparatus is operative to detect the deterioration of the traffic conditions on the second bearer by detecting a presence of packet marking.

17. The apparatus according to claim 12, operative to detect the deterioration of traffic conditions on the second bearer by detecting a transmitting buffer level rising to a second threshold value, wherein the transmitting buffer operates at a transmitting end on the second bearer.

18. The apparatus according to claim 11, wherein to adapt the first part of the media stream on the first bearer the apparatus is operative to increase bitrate of the first part of the media stream in response to improvement of traffic conditions on the second bearer.

19. The apparatus according to claim 18, operative to detect the improvement of the traffic conditions on the second bearer by determining that the second bearer can sustain an increased bitrate of the second part of the media stream.

20. A communications network comprising an apparatus, wherein the apparatus is for transmitting a real-time media stream in a communications network, and wherein the apparatus comprises a processing circuitry and a memory, the memory containing instructions executable by the processing circuitry such that the apparatus is operative to:
separate an essential part of the media stream from a non-essential part of the media stream in said real-time media stream;
transmit the essential part of the media stream on a first bearer and the non-essential part of the media stream on a second bearer, wherein priority of the first bearer is higher than priority of the second bearer;
perform adaptation of a rate of transmission of the essential part of the media stream in response to a change of traffic conditions on the second bearer,
wherein the first part of the media stream does not use the second bearer prior to the changed condition.

* * * * *